(12) United States Patent
Taylor

(10) Patent No.: US 12,699,999 B2
(45) Date of Patent: Aug. 4, 2026

(54) PSEUDONYMOUS PERSONA CODE-BASED AGE VERIFICATION TOKEN GENERATION

(71) Applicant: National Association of Convenience Stores, Alexandria, VA (US)

(72) Inventor: Gray Taylor, Georgetown, TX (US)

(73) Assignee: National Association of Convenience Stores, Alexandria, VA (US)

( * ) Notice: Subject to any disclaimer, the term of this patent is extended or adjusted under 35 U.S.C. 154(b) by 163 days.

(21) Appl. No.: 18/134,356

(22) Filed: Apr. 13, 2023

(65) Prior Publication Data

US 2024/0346501 A1 Oct. 17, 2024

(51) Int. Cl.
*G06Q 20/40* (2012.01)
*G06Q 20/38* (2012.01)

(52) U.S. Cl.
CPC ....... *G06Q 20/4014* (2013.01); *G06Q 20/385* (2013.01)

(58) Field of Classification Search
CPC .......................... G06Q 20/4014; G06Q 20/385
See application file for complete search history.

(56) References Cited

U.S. PATENT DOCUMENTS

| | | | |
|---|---|---|---|
| 9,406,067 B1 | 8/2016 | Robinson et al. | |
| 11,961,079 B2 | 4/2024 | Maheshwari et al. | |
| 2012/0130794 A1 | 5/2012 | Strieder | |
| 2021/0065267 A1 | 3/2021 | Smith et al. | |
| 2021/0234705 A1 | 7/2021 | Wesby et al. | |

| | | | |
|---|---|---|---|
| 2021/0319192 A1 | 10/2021 | Rodriguez et al. | |
| 2021/0350374 A1 | 11/2021 | Keen | |
| 2022/0005047 A1* | 1/2022 | Maheshwari ...... | G06Q 20/3223 |
| 2022/0129878 A1 | 4/2022 | Fitzsimmons et al. | |
| 2022/0253846 A1* | 8/2022 | Tobb .................... | G06V 30/418 |
| 2023/0061819 A1* | 3/2023 | Walker .................. | G06Q 20/32 |

(Continued)

FOREIGN PATENT DOCUMENTS

| | | | | |
|---|---|---|---|---|
| CA | 3084855 A1 * | 1/2021 | .......... | G06V 30/414 |
| WO | 2017151243 A1 | 9/2017 | | |

OTHER PUBLICATIONS

Grube; Effects of a responsible retailing mystery shop intervention on age verification by servers and clerks in alcohol outlets: A cluster randomised cross-over trial; Drug and alcohol review, Sep. 2018, vol. 37 (6), p. 774-781.*

(Continued)

*Primary Examiner* — Ilse I Immanuel
(74) *Attorney, Agent, or Firm* — Conley Rose, P.C.

(57) ABSTRACT

This disclosure is related to creating and verifying a pseudonymous persona in an age verification system. The pseudonymous persona may replace showing an identification card for an age-restricted product in a transaction. A mobile application may be used to send a machine-detectable representation of numerals and characters, such as information encoded in a PDF417 barcode of the identification card, to an age verification server via a network. The age verification server may generate an unverified pseudonymous persona code based on the machine-detectable representation. Once the pseudonymous persona code is verified, the age verification server may issue a single-use token for a transaction that includes one or more age-restricted products.

14 Claims, 9 Drawing Sheets

(56) References Cited

U.S. PATENT DOCUMENTS

2024/0195622 A1* 6/2024 Hanson .................. G06F 21/45

OTHER PUBLICATIONS

International Application No. PCT/US2024/024463, International Search Report and Written Opinion mailed Jul. 31, 2024, 10 pages.
International Application No. PCT/US2024/024466, International Search Report and Written Opinion mailed Jul. 31, 2024, 9 pages.
U.S. Appl. No. 18/134,384, Final Office Action mailed Feb. 9, 2026, 22 pages.
U.S. Appl. No. 18/134,384, Office Action mailed May 21, 2025, 13 pages.

* cited by examiner

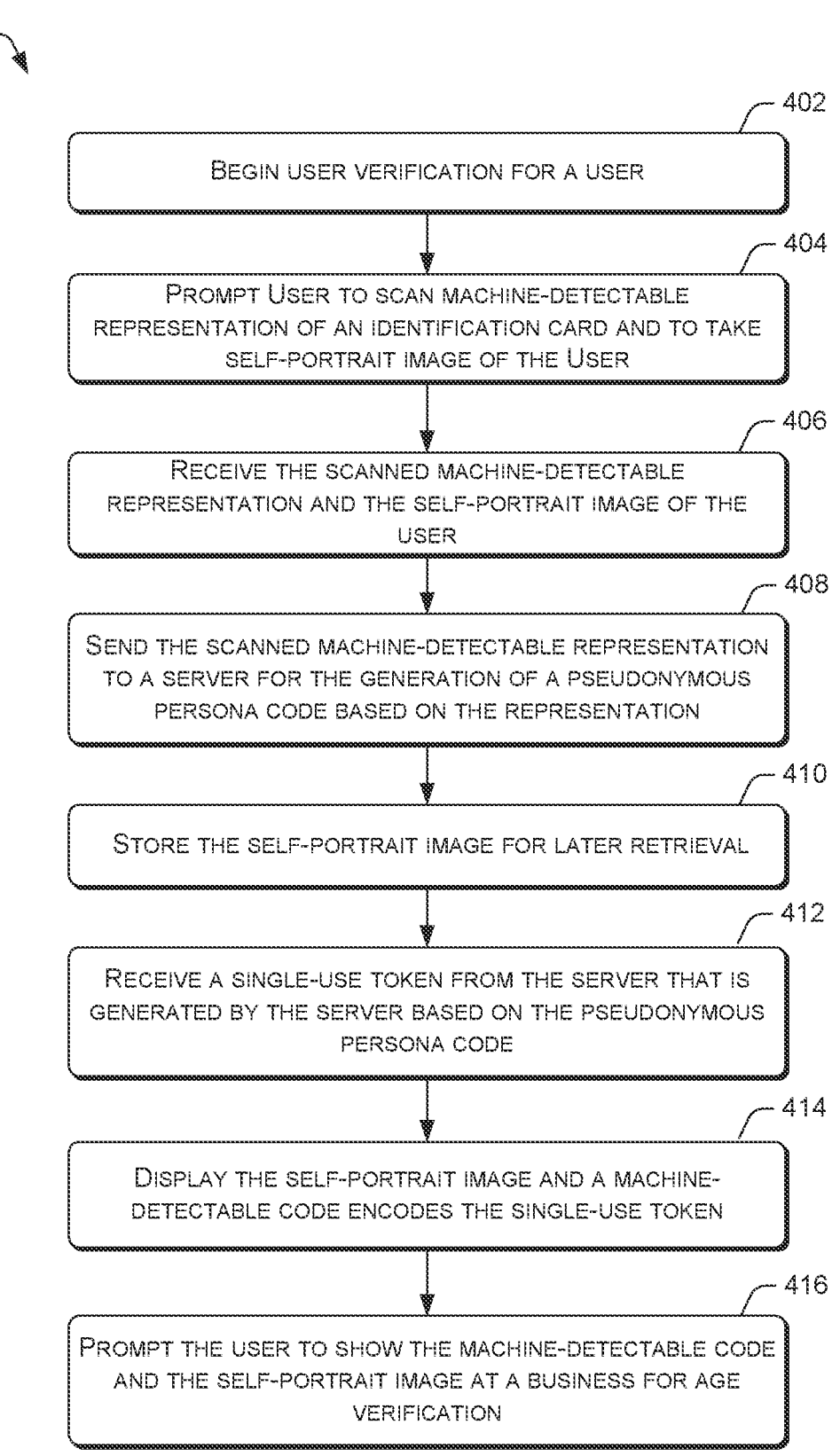

400

402

BEGIN USER VERIFICATION FOR A USER

404

PROMPT USER TO SCAN MACHINE-DETECTABLE REPRESENTATION OF AN IDENTIFICATION CARD AND TO TAKE SELF-PORTRAIT IMAGE OF THE USER

406

RECEIVE THE SCANNED MACHINE-DETECTABLE REPRESENTATION AND THE SELF-PORTRAIT IMAGE OF THE USER

408

SEND THE SCANNED MACHINE-DETECTABLE REPRESENTATION TO A SERVER FOR THE GENERATION OF A PSEUDONYMOUS PERSONA CODE BASED ON THE REPRESENTATION

410

STORE THE SELF-PORTRAIT IMAGE FOR LATER RETRIEVAL

412

RECEIVE A SINGLE-USE TOKEN FROM THE SERVER THAT IS GENERATED BY THE SERVER BASED ON THE PSEUDONYMOUS PERSONA CODE

414

DISPLAY THE SELF-PORTRAIT IMAGE AND A MACHINE-DETECTABLE CODE ENCODES THE SINGLE-USE TOKEN

416

PROMPT THE USER TO SHOW THE MACHINE-DETECTABLE CODE AND THE SELF-PORTRAIT IMAGE AT A BUSINESS FOR AGE VERIFICATION

602
SCAN A MACHINE-DETECTABLE CODE FROM A MOBILE DEVICE OF A USER FOR A TRANSACTION

604
SENDS THE MACHINE-DETECTABLE CODE TO A TOKEN AUTHORITY APPLICATION

606
DETERMINE WHETHER A SINGLE-USE TOKEN ENCODED IN THE MACHINE-DETECTABLE CODE IS VALIDATED BY THE TOKEN AUTHORITY APPLICATION

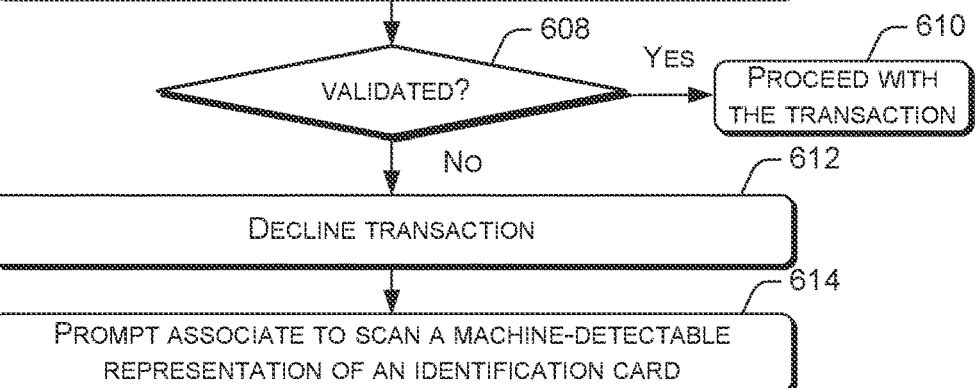

608
VALIDATED?

YES

610
PROCEED WITH THE TRANSACTION

No

612
DECLINE TRANSACTION

614
PROMPT ASSOCIATE TO SCAN A MACHINE-DETECTABLE REPRESENTATION OF AN IDENTIFICATION CARD

616
SEND THE SCANNED MACHINE-DETECTABLE REPRESENTATION A THIRD-PARTY AGE VERIFICATION PLATFORM

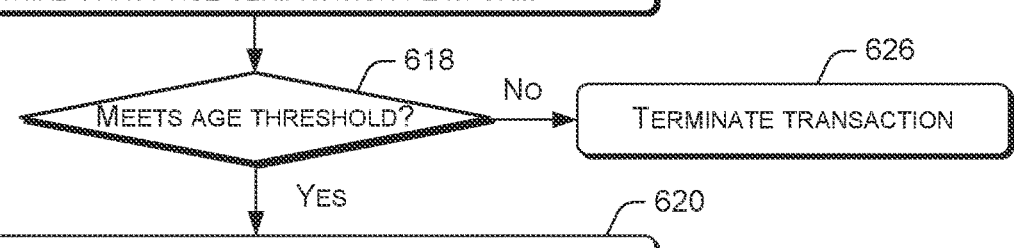

618
MEETS AGE THRESHOLD?

No

626
TERMINATE TRANSACTION

YES

620
SEND THE SCANNED MACHINE-DETECTABLE REPRESENTATION TO THE TOKEN AUTHORITY APPLICATION FOR THE GENERATION OF A PSEUDONYMOUS PERSONA CODE

622
RECEIVE A NEW SINGLE USE TOKEN THAT IS GENERATED BY THE TOKEN AUTHORITY APPLICATION FROM THE PSEUDONYMOUS PERSONA CODE

624
USE THE NEW SINGLE-USE AS PROOF OF LEGAL AGE FOR THE USER WITH RESPECT TO THE TRANSACTION

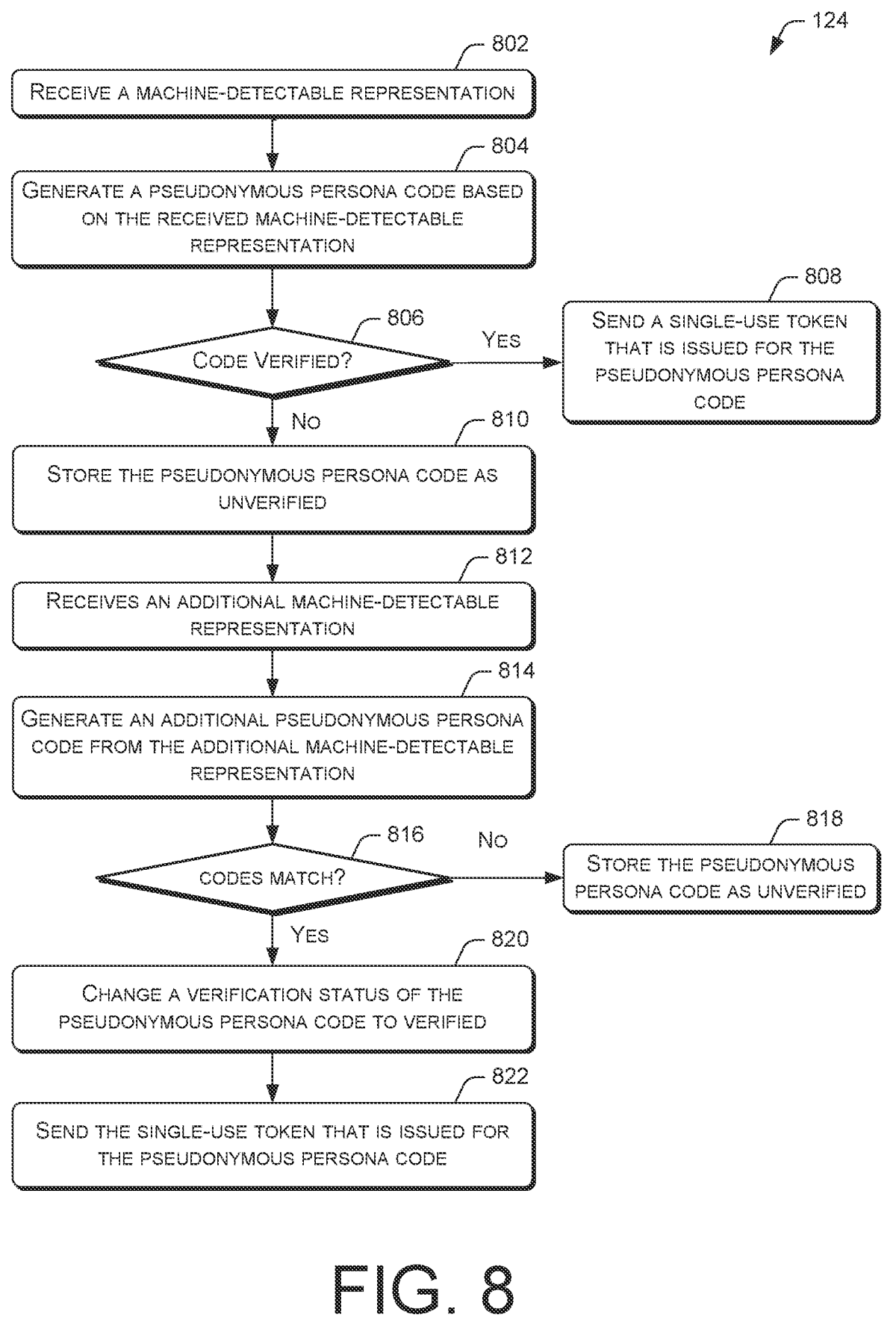

RECEIVE A MACHINE-DETECTABLE REPRESENTATION

804

GENERATE A PSEUDONYMOUS PERSONA CODE BASED ON THE RECEIVED MACHINE-DETECTABLE REPRESENTATION

806

CODE VERIFIED?

YES

808

SEND A SINGLE-USE TOKEN THAT IS ISSUED FOR THE PSEUDONYMOUS PERSONA CODE

No

810

STORE THE PSEUDONYMOUS PERSONA CODE AS UNVERIFIED

812

RECEIVES AN ADDITIONAL MACHINE-DETECTABLE REPRESENTATION

814

GENERATE AN ADDITIONAL PSEUDONYMOUS PERSONA CODE FROM THE ADDITIONAL MACHINE-DETECTABLE REPRESENTATION

816

CODES MATCH?

No

818

STORE THE PSEUDONYMOUS PERSONA CODE AS UNVERIFIED

YES

820

CHANGE A VERIFICATION STATUS OF THE PSEUDONYMOUS PERSONA CODE TO VERIFIED

822

SEND THE SINGLE-USE TOKEN THAT IS ISSUED FOR THE PSEUDONYMOUS PERSONA CODE

FIG. 8

PSEUDONYMOUS PERSONA CODE-BASED AGE VERIFICATION TOKEN GENERATION

BACKGROUND

Age verification for certain products (e.g., alcoholic beverages, tobacco products, etc.) is required at convenience stores. Currently, store associates are tasked with checking identification cards, such as a driver's license, to verify the age necessary to sell age-restricted products. However, in some instances, underage customers may try to circumvent age verification by using fraudulent identifications to try to fool store associates into thinking that they are over the legal age limits for purchasing such products. Desirable in the art is an improved age verification that would improve upon the conventional age verification.

BRIEF DESCRIPTION OF THE DRAWINGS

The detailed description is described with reference to the accompanying figures, in which the left-most digit(s) of a reference number identifies the figure in which the reference number first appears. The use of the same reference numbers in different figures indicates similar or identical items.

FIG. 4 is a flow diagram of an example process for creating and verifying users using a mobile device in the age verification system, such as that shown in FIG. 1, in accordance with various embodiments.

FIG. 6 is a flow diagram of an example process for creating and verifying users using a point-of-sale controller in the age verification system, such as that shown in FIG. 1, in accordance with various embodiments.

FIG. 8 is a flow diagram of an example process for creating and verifying users using an age verification server in the age verification system, such as that shown in FIG. 1, in accordance with various embodiments.

DETAILED DESCRIPTION

This disclosure is directed to techniques for creating and verifying a pseudonymous persona in an age verification system. The pseudonymous persona may replace showing an identification card for an age-restricted product in a transaction. A mobile application may be used to initiate a conversion of a machine-detectable representation of numerals and characters, such as information encoded in a PDF417 barcode of the identification card, to a pseudonymous persona code by an age verification server. Once the pseudonymous persona code is generated, the age verification server may issue a single-use token based on the pseudonymous persona code for a transaction that includes one or more age-restricted products.

The use of single-use tokens for age verification may provide a quick and convenient way for retailers and other parties to verify that a user meets an age threshold for purchasing, taking possession, or otherwise accessing age-restricted products in various forms of transactions with or without the use of a government-issued identification card by the user. The use of the single-use token for age verification may also serve to protect the privacy of individuals by reducing situations in which users are asked to show their identification information to individuals that are unknown to them. The techniques described herein may be implemented in a number of ways. Example implementations are provided below with reference to the following figures.

Example Network Architecture

Figure 1:
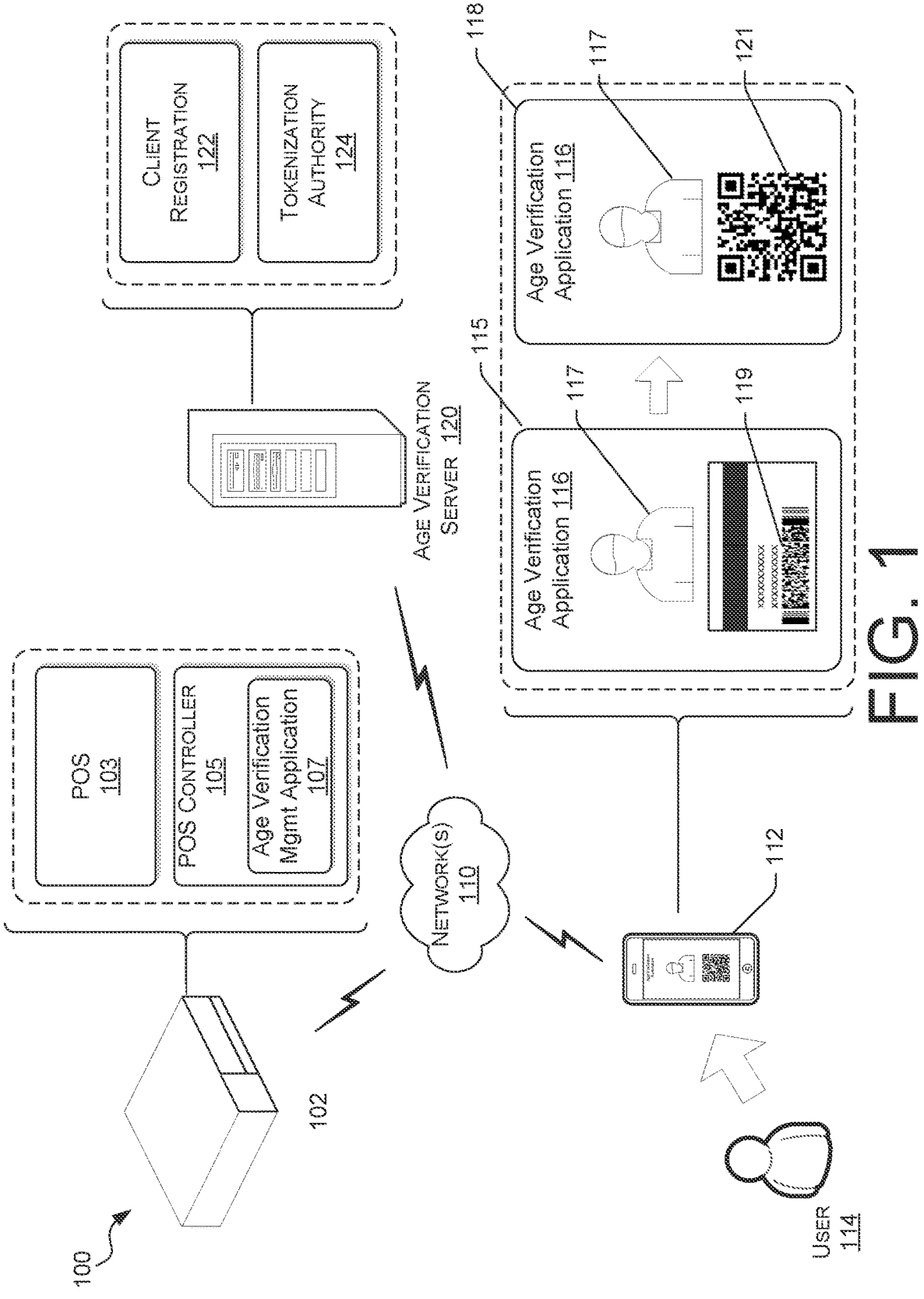
FIG. 1 illustrates an example architecture for creating and verifying users in an age verification system in accordance with various embodiments.

FIG. 1 illustrates an example network architecture for creating and verifying users in an age verification system 100. The network architecture may provide telecommunication and data communication in a wired and/or wireless network 110. The network architecture may include business (vendor) 102 having point of sale (POS) device 103 and POS controllers 105, user(s) 114 having a mobile device(s) 112 that is installed with an age verification application 116, an age verification server 120 that includes applications, such as, a client registration application 122 and a tokenization authority application 124, and the network 110 that may be used to transmit and receive data among the business (vendor) 102, users 114, and the age verification server 120.

A user 114 can create a pseudonymous persona code by way of the age verification application 116, which requests the user 114 to scan or capture a picture of a machine-detectable representation 119 (e.g., a PDF417 barcode, a QR code, another type of stacked linear barcode, some other equivalent barcode, or a magnetic stripe) on a government-issued identification card, for example, and to take a self-portrait image 117 (commonly referred to as a "selfie" or "selfie picture") of the user 114. The self-portrait image 117 is stored by the age verification application 116 in a memory of the mobile device 112 for later use by the age verification application 116. The government-issued identification card can include a driver's license, passport, military identification card, etc. The machine-detectable representation 119 may contain embedded information about the user 114. For example, such information may include full name, mailing address, date of birth, card number, expiration date, physical characteristic information of the user 114, issue authority identification information, restriction information, and/or so forth. In some instances, the age verification application 116 can display the scanned machine-detectable representation 119 and the taken self-portrait image 117 on a display of the mobile device 112, such as that shown on screenshot 115. The age verification application 116 may request that the tokenization authority application 124 generate the pseudonymous persona code based on the scanned machine-detectable representation 119 by sending the machine-detectable representation 119 to the tokenization authority application 124. In turn, the tokenization authority application 124 may convert the machine-detectable representation 119 into a pseudonymous persona code that serves as the basis for generating associated single-use tokens that can be used as proof of legal age for transactions involving one or more age-restricted products. The tokenization authority application 12 may further send the single-use tokens to the age verification application 116. In turn, the age verification application 116 may convert each single-use token into a machine-detectable code 121 (e.g., a QR code) or any other machine-detectable code. The age verification application 116 may display the machine-detectable code 121 or the other machine-detectable code, such as that shown on screenshot 118, as proof of legal age.

The age verification application 116 may transmit the machine-detectable representation 119 to the tokenization authority application 124 at the age verification server 120 via the network 110. Following the generation of the pseudonymous persona code from the machine-detectable representation 119, the tokenization authority application 124 may store the pseudonymous persona code in a database (not shown). The tokenization authority application 124 can verify the pseudonymous persona code in a first transaction by the user 114 at the business 102, who is a vendor of the age verification system 100. The POS controller 105 includes an age verification management application 107 that may facilitate verifying the pseudonymous persona code, the taken self-portrait image 117, the user 114, and the scanned machine-detectable representation 119. Once the verification process of the pseudonymous persona code is successful, the tokenization authority application 124 may issue a single-use token for an age-restricted product in a transaction. The data and information that is sent between the various components of the age verification system 100, as well as between the various components and third-party platforms and system, may be transmitted via secured communication channels, such as communication channels that are secured via the Hypertext Transfer Protocol Secure (HTTPS) protocol or a comparable protocol. Additionally, some of the data may be digitally signed with the signature of a trusted service provider, such as the age verification server 120 or a trusted third-party. Additionally, the data may be further encrypted via an asymmetric encryption or a symmetric encryption scheme to protect against tampering during transfer. The age verification system 100 is further described and shown in subsequent figures.

Example Protocol Sequence

Figure 2:
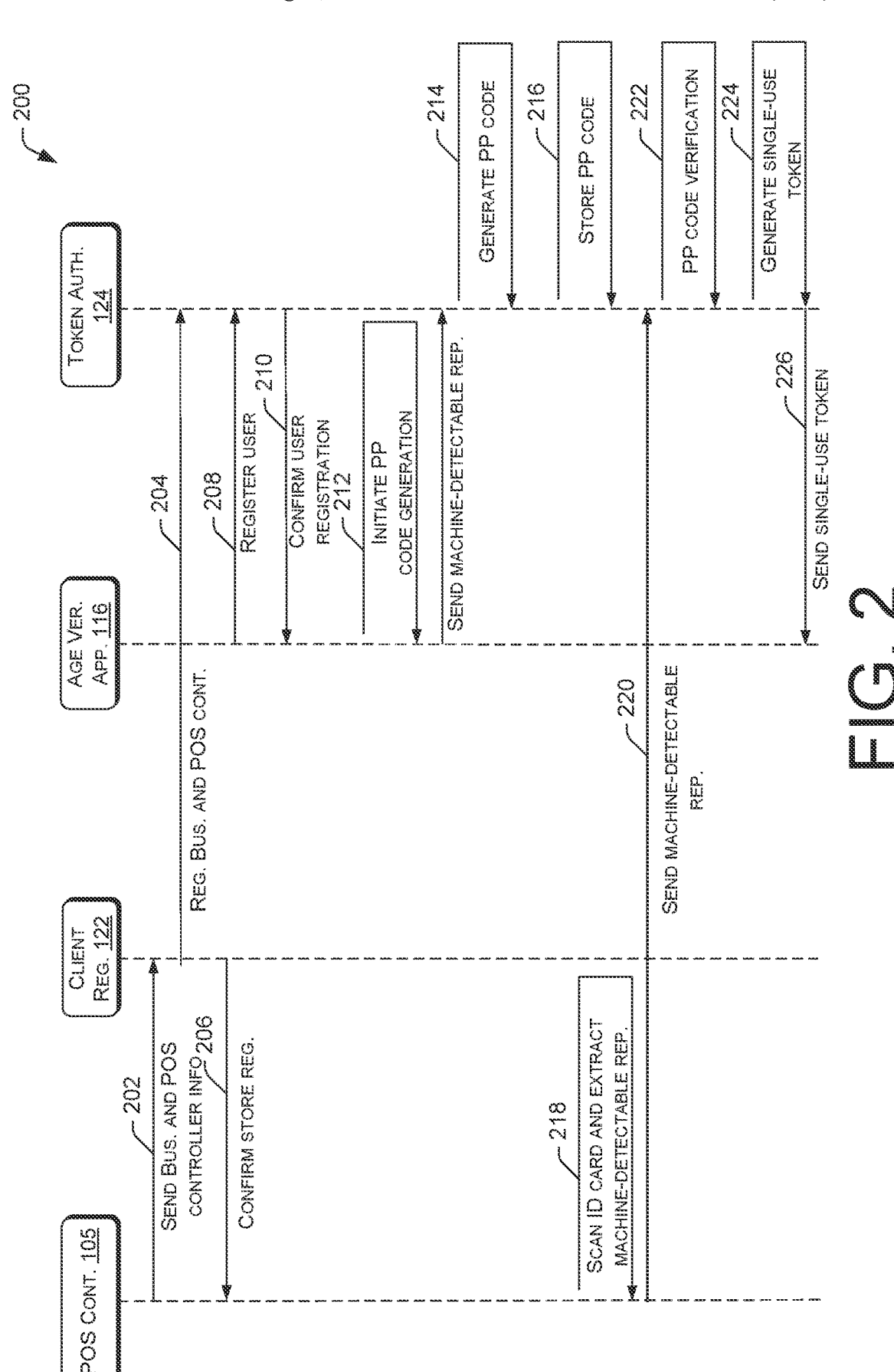
FIG. 2 is a diagram that shows a protocol sequence of a system for creating and verifying users in the age verification system, such as that shown in FIG. 1, in accordance with various embodiments.

FIG. 2 is a diagram that shows a protocol sequence 200 for creating and verifying users in the age verification system 100, such as that shown in FIG. 1. At 202, a business 102 that uses the age verification system 100 registers with the client registration application 122 at the age verification server 120 by sending the business and POS controller information. At 204, the client registration application 122 registers the business 102 and the POS controller 105 with the tokenization authority application 124 using standard registration processes and protocols. At 206, the client registration application 122 confirms registration of the business 102 and the POS controller 105 with the POS controller 105. At 208, the age verification application 116 on the mobile device 112 is used to register a user of the mobile device 112 with the tokenization authorization authority 124 by sending user information of the user 114 to the client registration application 122. At 210, the client registration application 122 confirms registration of the user 114 with the tokenization authority application 124. At 212, the age verification application 116 at the mobile device 112 may be instructed by the user 114 to initiate the generation of a pseudonymous persona code by the tokenization authority application 124 on the age verification server 120 using the machine-detectable representation 119 (FIG. 1, e.g., PDF417 barcode) of an identification card that identifies the user 114. For example, the machine-detectable representation 119 may be scanned using an imager, e.g., a camera, of the mobile device 112.

In some embodiments, the age verification application 116 on the mobile device 112 may, prior to sending the machine-detectable representation 119 to the tokenization authority application 124, send the machine-detectable representation 119 to a third-party age verification platform, such as a platform that is operated by a third-party service provider or a government entity. The third-party age verification platform may extract the date of birth information from the machine-detectable representation 119 and calculate a current age of the user 114 based on the date of birth information. Subsequently, the third-party age verification platform may determine whether the current age of the user 114 at least meets a predetermined legal age threshold in a corresponding legal jurisdiction (e.g., 16 years of age, 18 years of age, 21 years of age, etc.). In some instances, the third-party age verification platform may set a predetermined legal age threshold for the requests from a business based on the specifications (e.g., type of product) provided by a business and/or the laws of the legal jurisdiction that in which the business operates. Thus, if the current age of the user 114 at least meets the legal age threshold, the third-party age verification platform may notify the age verification application 116 that the user 114 meets the legal age threshold. Accordingly, the age verification application 116 may send the machine-detectable representation 119 to the tokenization authority application 124 for the generation of the pseudonymous persona code. Otherwise, if the legal age threshold is determined to be not met, the third-party age verification platform may notify the age verification application 116. In turn, the age verification application 116 may refrain from sending the machine-detectable representation 119 to the tokenization authority application for the generation of the pseudonymous persona code. In some instances, the age verification application 116 may also present a message to the user 114 indicating that the user 114 is not verified as being of a legal age. Thus, such a lack of legal age verification also results in a termination of the process without providing a single-use token to the age verification application 116 for use by the user 114. In additional embodiments, the third-party age verification platform also extracts additional information from the machine-detectable representation 119, including information related to an issuer, license number of the user, and expiration date of the card. Based on the extracted information, the third-party age verification platform determines whether the identification card is an authentic government-issued identification card. For example, the third-party age verification platform may determine that the identification card is authenticated when the information extracted from the identification card matches the information of a known valid identification card in an identification card database accessible to the third-party age verification platform. Thus, in such embodiments, the third-party age verification platform may notify the age verification application 116 that the user 114 meets the legal age threshold when the current age of the user 114 at least meets the legal age threshold and the identification card is determined to be an authentic government-issued identification card. In turn, the age verification application 116 may send the machine-detectable representation 119 to the tokenization authority application 124 for the tokenization authority application 124 to convert into a pseudonymous persona code. In some embodiments, rather than sending the machine-detectable representation 119 to a third-party age verification platform directly, the age verification application 116 may send the machine-detectable representation 119 to the tokenization authority application 124 for the application to pass the machine-detectable representation 119 to the third-party age verification platform. Accordingly, the tokenization authority application 124 may directly make a determination of whether to proceed with the generation of the pseudonymous persona code from the machine-detectable representation 119 based on the result notifications from the third-party verification platform in a similar manner. Thus, in some instances, the tokenization authority application 124 may generate the pseudonymous persona code if the user 114 at least meets the legal age threshold. In other instances, the tokenization authority application 124 may generate the pseudonymous persona code if the current age of the user 114 at least meets the legal age threshold and the identification card is determined to be an authentic government-issued identification card.

At 214, the tokenization authority application 124 generates a pseudonymous persona code based on the information in the machine-detectable representation 119 received from the age verification application 116. At 216, the tokenization authority application 124 stores the generated pseudonymous persona code associated with the user 114 as unverified in a data store of the age verification server 120. At 218, the POS controller 105 scans a machine-detectable representation (e.g., a PDF417 barcode, a QR code, another type of stacked linear barcode, some other equivalent barcode, or a magnetic stripe) on a government-issued identification card that is presented by the user 114. For example, such a scan of the machine-detectable representation may be performed by a sales associate of the business 102 when the user 114 with the mobile device 114 shows up at the business 102 for the first time to purchase one or more age-restricted products. At 220, the age verification management application 107 sends the scanned machine-detectable representation to the token authority application 124.

At 222, the tokenization authority application 124 generates an additional pseudonymous persona code from the scanned machine-detectable representation. The tokenization authority application 124 may then further determine that this pseudonymous persona code matches a pseudonymous persona code already stored in the data store of the age verification server. The additional pseudonymous persona code may be generated using the same hashing algorithm that was used to generate the pseudonymous persona code. Thus, a matching of the two pseudonymous persona codes means that the two codes are generated from two scans of the same machine-detectable representation. At 224, the tokenization authority application 124 designates the stored pseudonymous persona in the data store as verified and generates a single-use token for a transaction (e.g., sales transaction, loan transaction, leasing transaction, a change of custody transaction, or any other types of transactions) responsive to verifying the pseudonymous persona code successfully. For example, the tokenization authority application 124 may generate a single-use token via a random value generator (e.g., a global unique identification value (GUID) generator) and then associate the token with the pseudonymous persona code. Alternatively, if the stored pseudonymous persona code in the data store does not match the additional pseudonymous persona code generated from the machine-detectable code at 222, the stored pseudonymous persona code remains continuously stored in the data store as an unverified pseudonymous persona code by the tokenization authority application 124. At 226, the tokenization authority application 124 sends the single-use token to the age verification application 116 on the mobile device 112 to complete the process of providing the single-use token for use by the user 114. The single-use token may be further used by the user 114 as proof of legal age to purchase one or more age-restricted products. The processes at the POS controller 105, the mobile device 112, and at the age verification server 120 are further described and shown in subsequent FIGS.

In some alternative instances, the user 114 may show up at the business 102 without having performed 208, 210, and 212. In such instances, the age verification management application 107 at the POS controller 105 may be used to scan the machine-detectable representation 119 (FIG. 1, e.g., PDF417 barcode) of the identification card that identifies the user 114. The scan may be performed using an imager, e.g., a camera, that is connected to the POS controller 105. The scan may be performed by the sales associate of the business 102 after the sales associate has been instructed by the age verification management application 107 to verify that a self-portrait picture of a person on the identification card matches the facial appearance of the user 114. In this way, the scan is only performed when the self-portrait picture matches the facial appearance of the user 114. The age verification management application 107 then sends the machine-detectable representation 119 to the third-party age verification platform. The third-party age verification platform may extract the date of birth information from the machine-detectable representation 119 and calculate a current age of the user 114 based on the date of birth information. Subsequently, the third-party age verification platform may determine whether the current age of the user 114 at least meets a predetermined legal age threshold. Thus, if the current age of the user 114 at least meets the legal age threshold, the third-party age verification platform may notify the age verification management application 107 that the user 114 meets the legal age threshold.

Alternatively, the third-party age verification platform may notify the age verification management application 107 that the user 114 meets the legal age threshold if the current age of the user 114 meets the legal age threshold, and the identification card is determined to be an authenticate government-issued identification card. Following a receipt of a notification that the user 114 meets the legal age threshold, the age verification management application 107 may send the machine-detectable representation 119 to the tokenization authority application 124. In turn, the token authority application 124 generates a verified pseudonymous persona code based on the machine-detectable representation 119 for storage in a data store of the age verification server 120. Furthermore, the tokenization authority application 124 further generates a single-use token from the verified pseudonymous persona code. The single-use token is then sent by the tokenization authority application 124 to the POS controller 105 as proof of legal age of the user 114 for the purchase of one or more age-restricted products. At this point, the sales associate may encourage the user 114 to perform 208, 210, and 212 such that additional single-use tokens may be sent directly to the age verification application 116 on the mobile device 112 in the future.

Otherwise, if the legal age threshold is determined to be not met, the third-party age verification platform may notify the age verification management application 107 to refrain from sending the machine-detectable representation 119 to the tokenization authority application 124 so that a pseudonymous persona code and associated single-use token may be generated. In some instances, the third-party age verification platform may also instruct the age verification management application 107 to present a message to the sales associate indicating that the user 114 is not verified as being of a legal age.

Example Computing Components

Figure 3:
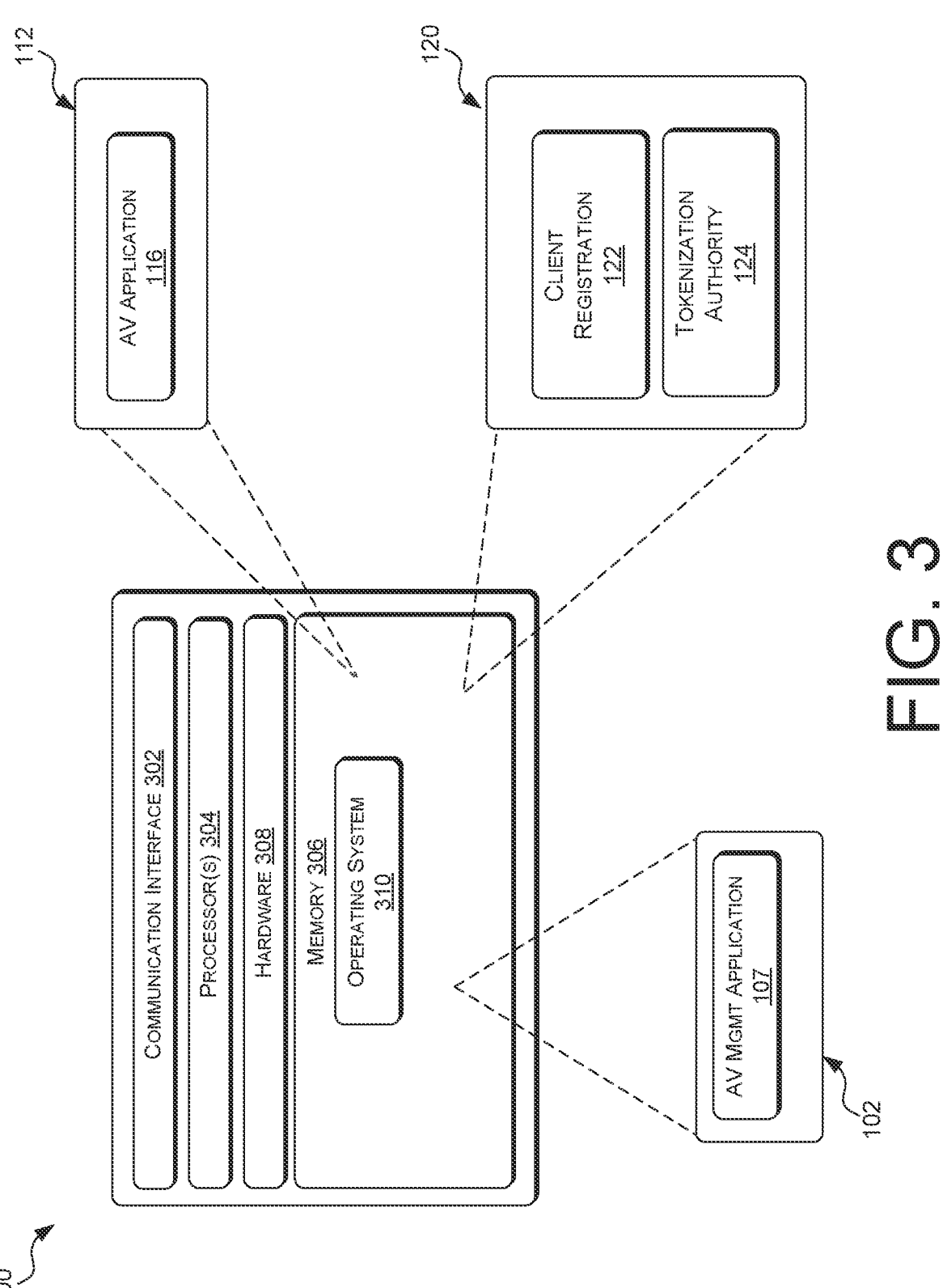
FIG. 3 is a block diagram showing various components of a server, mobile device, POS controller, and other similar computing devices that facilitate creating and verifying users in the age verification system, such as that shown in FIG. 1, in accordance with various embodiments.

FIG. 3 is a block diagram showing various components of a computing device 300, such as a server 120, a mobile device 112, or a POS controller 105, that facilitate creating and verifying users in the age verification system 100, such as that shown in FIG. 1. The computing device 300 may include a communication interface 302, one or more processors 304, and memory 306. The communication interface 302 may include wireless and/or wired communication components that enable the computing device 300 to transmit data to and receive data from other networked devices. The computing device 300 may be accessed via hardware 308. The hardware 308 may include user interface, data communication, or data storage hardware. For example, the user interfaces may include a data output device (e.g., visual display, audio speakers), and one or more data input devices. The data input devices may include, but are not limited to, combinations of one or more of scanners, cameras, keypads, keyboards, mouse devices, touch screens that accept gestures, microphones, voice or speech recognition devices, and any other suitable devices.

The memory 306 may be implemented using computer-readable media, such as computer storage media. Computer-readable media includes, at least, two types of computer-readable media, namely computer storage media and communications media. Computer storage media includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD), high-definition multimedia/data storage disks, or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanisms. In some embodiments, the computing devices 300 or components thereof may be implemented using virtual computing devices in the form of virtual machines or software containers that are hosted in a computing cloud. The computing cloud may include a variety of disaggregated servers that provide virtual application server functionalities and virtual storage functionalities.

The memory 306 may store the operating system 314. In embodiments in which the computing device 300 is used to implement the POS controller 105, the computing device 300 may be used to execute applications such as the age verification management application 107. In embodiments in which the computing device 300 is used to implement the mobile device 112, the computing device 300 may be used to execute applications such as the age verification application 116. Further, in embodiments in which the computing device is used to implement the age verification server 120, the computing device may be used to execute applications such as the client registration application 122 and the tokenization authority application 124. The modules may include routines, program instructions, objects, and/or data structures that are executable by the processors 304 to perform particular tasks or implement particular abstract data types. The processes of the tokenization authority application 124, age verification application 116, and age verification management application 107 are further described and shown in subsequent FIGS.

Example Process of a Mobile Device

FIG. 4 is a flow diagram of an example process 400 for creating and verifying users using the mobile device 112 in the age verification system 100, such as that shown in FIG. 1. At block 402, the user 114 opens the age verification application 116, which begins the user verification process. At block 404, the age verification application 116 prompts the user 114 to scan a machine-detectable representation 119 of an identification card and to capture a self-portrait image 117 of the user 114. At block 406, the age verification application 116 receives the scanned machine-detectable representation 119 and the captured self-portrait image 117.

At block 408, the age verification application 116 sends the scanned machine-detectable representation 119 to the token authority application 124 on the age verification server 120. In turn, the token authority application 124 generates a pseudonymous persona code based on the scanned machine-detectable representation 119. The pseudonymous persona code may be a hash generated code having any number of bits of data. The pseudonymous persona code may be generated based on information related to an issuer, date of birth of the user, license number of the user, expiration date of the card, and/or so forth as encoded in the scanned machine-detectable representation 119. For example, the age verification application 116 may apply a hash algorithm to the information in the machine-detectable representation 119 to generate the pseudonymous persona code. In various instances, the hash algorithm may be an HMAC algorithm, a SHA256 algorithm, an RSASSA-PSS algorithm, or some other hash algorithm. In some embodiments, the hash algorithm may support variable length output. Thus, the pseudonymous persona code may be a hash code having any number of bits of data. Since the information in the machine-detectable representation in a government-issued identification card of a corresponding user is unique, a pseudonymous persona code that is generated based on such machine-detectable representation is a globally unique code that uniquely identifies the corresponding user. In some instances, the token authority application 124 may generate the pseudonymous persona code after a third-party age verification platform has determined that the date of birth indicates a user associated with the date of birth is of legal age to purchase one or more age-restricted products. Alternatively, the third-party age verification platform must also determine that the identification card is an authentic government-issued identification card for the age verification application to generate the pseudonymous persona code. At block 410, the age verification application 116 may further store the captured self-portrait image 117 in a memory of the mobile device 112 for later retrieval by the age verification application 116.

At block 412, the age verification application 116 receives a single-use token from the tokenization authority application 124 on the age verification server 120 that is generated by the application based on the pseudonymous persona code. At block 414, the age verification application 116 generates a machine-detectable code (e.g., QR code) that encodes the single-use token and displays on the mobile device 112 the captured self-portrait image 117 and the machine-detectable code as proof of legal age for a transaction the includes one or more age-restricted items. This machine-detectable code may be decoded by the age verification management application 107 of the POS controller 105 back into the single-use token. At block 416, the age verification application 116 prompts the user 114 to show the generated machine-detectable representation 121 and the self-portrait image 117 at a business 102 for age verification. Additionally, or alternatively, the age verification application 116 may use an email address of the user 114 or a mobile phone number for text messaging as an out-of-band verification to verify the user 114 in a transaction.

Components of a Mobile Device

Figure 5:
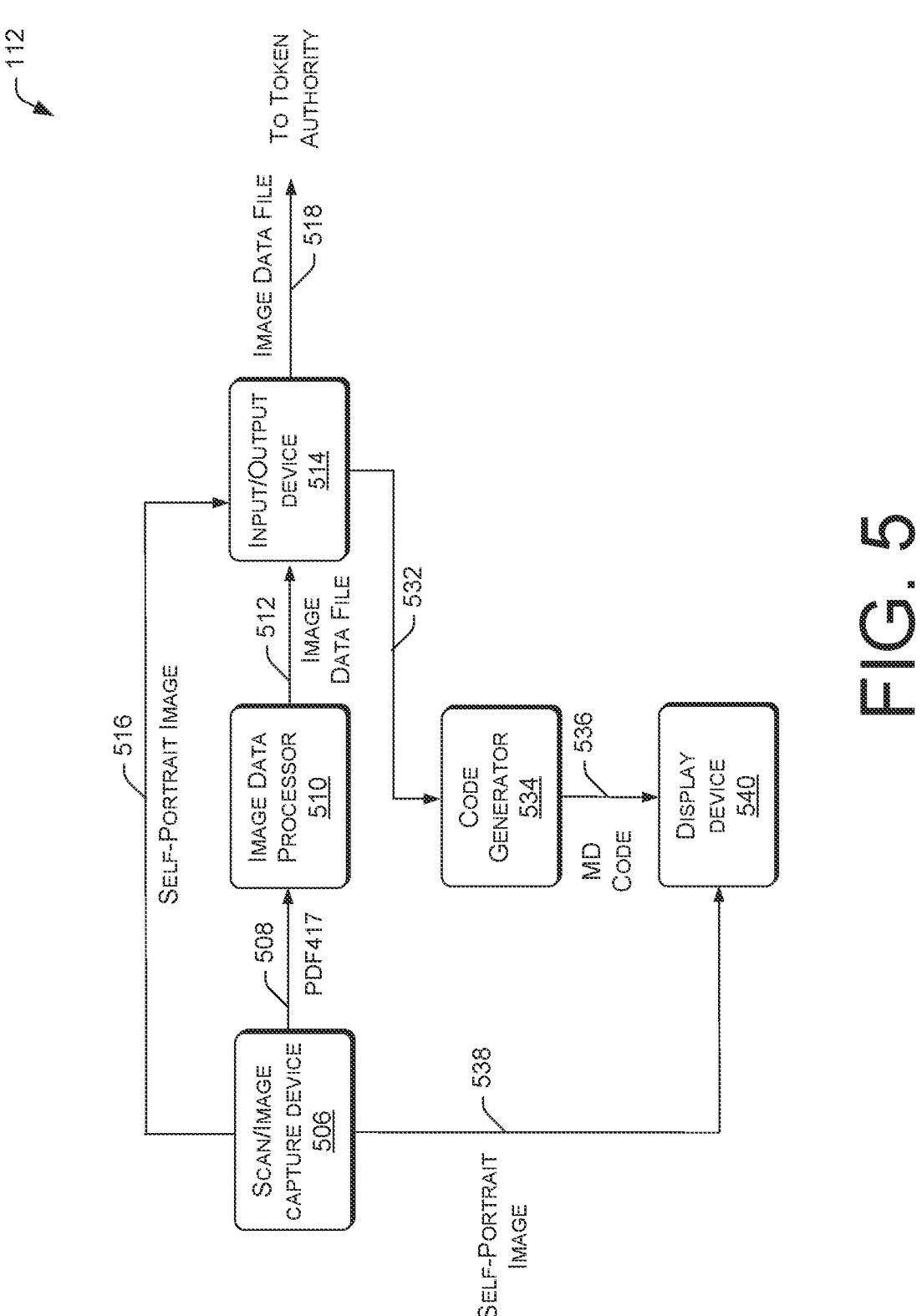
FIG. 5 is a block diagram showing various components of a mobile device that implements creating and verifying users in the age verification system, such as that shown in FIG. 1, in accordance with various embodiments.

FIG. 5 is a block diagram showing various components of the mobile device 112 that implements creating and verifying users in the age verification system 100, such as that shown in FIG. 1. The age verification application 116 begins the user verification process by instructing a scan/image capture device 506 to scan a machine-detectable representation 119 of an identification card and to capture a self-portrait image 117 of the user 114. The scan/image capture device 506 sends the scanned machine-detectable representation 119 at line 508 to an image data processor 510, which generates an image data file that includes the scanned machine-detectable representation 119. The image data processor 510 sends the generated image data file at line 512 to the input/output (I/O) device 514, which also receives the captured self-portrait image 117 from the scan/image capture device 506 at line 516. The age verification application 116 instructs the I/O device 514 to send the generated image data file to the tokenization authority application 124 at line 518 via the network 110 to generate the pseudonymous persona code.

The I/O device 514 sends the single-use token received from the tokenization authority application 124 at line 532 to the code generator 534 to generate a machine-detectable representation 121 (e.g., QR code). The code generator 534 sends the machine-detectable code 121 at line 536 to a display device 540, which also receives the self-portrait image 117 from the scan/image capture device 506 at line 538. The display device 540 displays on the mobile device 112 the captured self-portrait image 117 and the machine-detectable code 121 that can be provided by the age verification management application 107 of the POS controller 105 to the token authority application 124 such that the single-use token encoded by the machine-detectable code 121 may be validated by the token authority application 124. The age verification application 116 may instruct the display device 540 to prompt the user 114 to show the machine-detectable code 121 and the self-portrait image 117 to the POS device 103 at the business 102.

Example Process of a Point-of-Sale Controller

FIG. 6 is a flow diagram of an example process 600 for creating and verifying users using a point-of-sale controller 105 in the age verification system 100, such as that shown in FIG. 1. At block 602, the age verification management application 107 of the POS controller 105 scans a machine-detectable code that encodes a single-use token from a screen of a mobile device 112 of the user 114 as a part of a transaction that requires age verification. In some embodiments, prior to scanning the machine-detectable code, the age verification management application 107 may prompt a sales associate to verify whether the facial appearance of the user 114 matches the self-portrait image 117 displayed on the screen of the mobile device 112 along with the machine-detectable code as a precondition to performing the scan. In this way, the machine-detectable code is only scanned when the facial appearance of the user 114 matches the self-portrait image 117.

At block 604, the age verification management application 107 sends the machine-detectable code that encodes the single use token to the token authority application 124. At block 606, the age verification management application 107 determines whether the single-use token encoded in the machine-detectable code is validated by the token authority application 124. At decision block 608, responsive to determining that the single-use token has been validated, the process 600 proceeds to block 610. At block 610, the age verification management application 107 generates and displays a message that prompts the sales associate to proceed with the transaction. However, responsive to determining at decision block 608 that the single-use token has not been validated, the process 600 proceeds to block 612. At block 612, the age verification management application 107 generates and displays a message that prompts the sales associate to decline the transaction. In some instances, the process 600 may subsequently proceed from block 612 to block 614.

At block 614, the age verification management application 107 may prompt the sales associate to scan a machine-detectable representation of a government-issued identification card of the user 114. In some embodiments, prior to scanning the machine-detectable representation, the age verification management application 107 may prompt the sales associate to verify whether the facial appearance of the user 114 matches a photograph of the user 114 on the government-issued identification card. In this way, the machine-detectable representation is only scanned by the sales associate when the facial appearance of the user 114 matches the self-portrait image 117. Alternatively or additionally, the age verification management application 107 may use comparative facial recognition technology that can scan the picture on the identification card and take a self-portrait photograph (not shown) of a user via a camera, such that the comparative facial recognition technology may determine whether the self-portrait photograph (not shown) taken by the comparative facial recognition technology matches with the picture on the identification card and the self-portrait image 117 of the user 114 that is displayed on the mobile device 112 matches. Accordingly, the age verification management application 107 may prompt the sales associate to scan the machine-detectable representation of the government-issued identification card when the match is determined. Otherwise, the age verification management application 107 may generate and display a message that prompts the sales associate to decline the transaction.

At block 616, the age verification management application 107 sends the scanned machine-detectable representation 119 to a third-party age verification platform. At decision block 618, the age verification management application 107 determines whether a notification that the user 114 meets a legal age threshold for the transaction is received from the third-party age verification platform. At block 620, responsive to receiving a notification at decision block 618 that the user 114 meets the legal age threshold, the age verification management application 107 may send the scanned machine-detectable representation 119 to the token authority application 124, such that the token authority application generates a pseudonymous persona code. At block 622, the age verification management application 107 may receive a new single-use token from the token authority application 124. The new single-use token is generated by the token authority application 124 from the pseudonymous persona code.

At block 624, the age verification management application 107 may use the new single-use token as the proof of legal age for the user 114 with respect to the transaction. At block 626, responsive to receiving a notification that the user 114 does not the legal age threshold from the third-party age verification platform, the age verification management application 107 may generate and display a message that prompts the sales associate to terminate the transaction.

Components of a Point-of-Sale Controller

Figure 7:
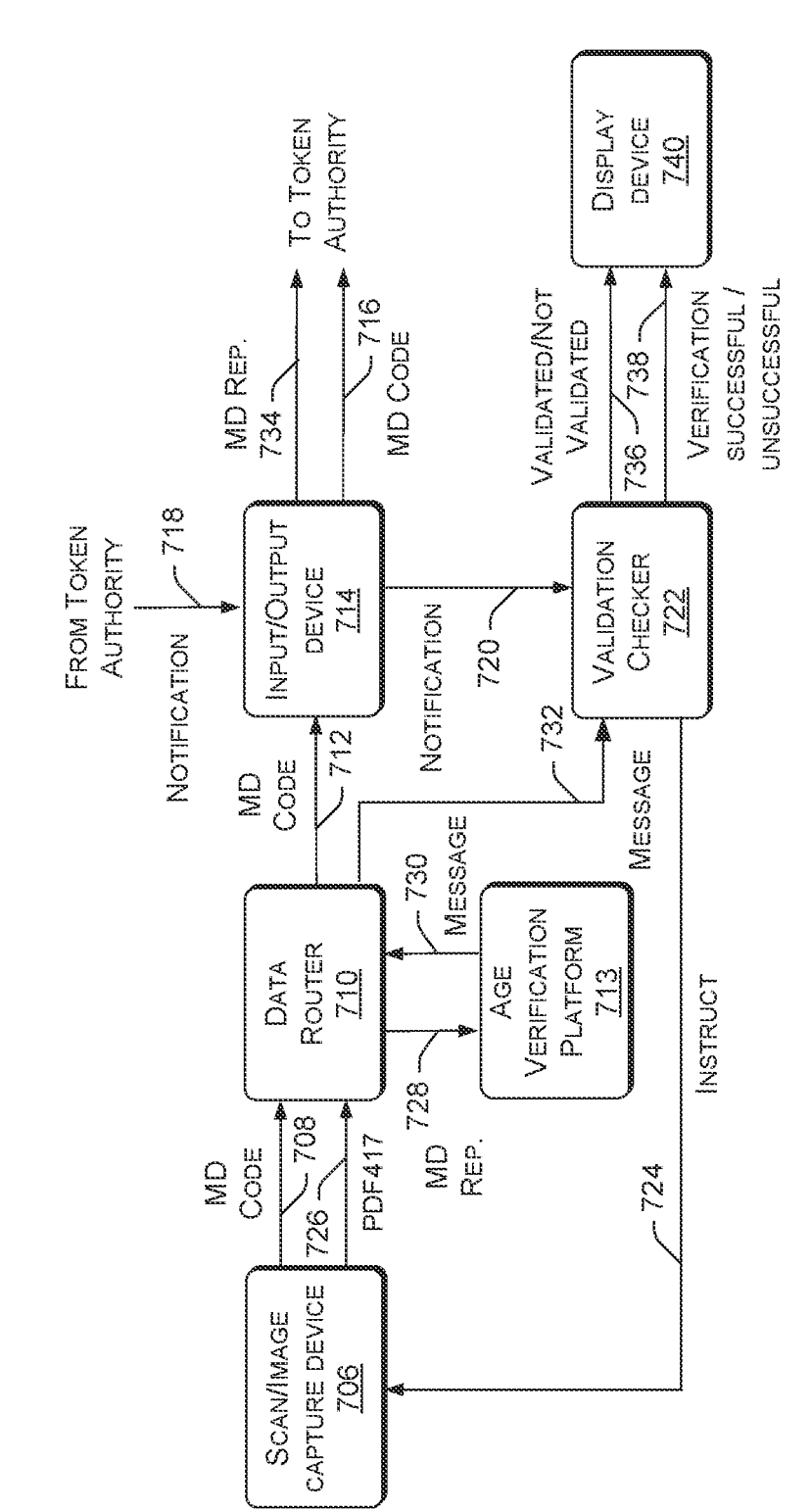
FIG. 7 is a block diagram showing various components of a point-of-sale controller that implements creating and verifying users in the age verification system, such as that shown in FIG. 1, in accordance with various embodiments.

FIG. 7 is a block diagram showing various components of a point-of-sale controller 105 that implements creating and verifying users in the age verification system 100, such as that shown in FIG. 1. The age verification management application 107 of the POS controller 105 instructs the scan/image capture device 706 to scan a machine-detectable representation (e.g., QR code) from a mobile device 112 of a user and send the scanned machine-detectable code at line 708 to a data router 710, which sends the scanned machine-detectable code at line 712 to an input/output (I/O) device 714. The age verification management application 107 instructs the I/O device 714 to send the scanned machine-detectable code to a tokenization authority application 124 at line 716.

The I/O device 714 receives a notification from the tokenization authority application 124 at line 718 indicating that the single-use token encoded by the scanned machine-detectable code is not validated. The I/O device 714 sends the notification to a validation checker 722 at line 720. Responsive to determining that the single-use token is not validated, the validation checker 722 instructs the display device 740 at line 736 to display a message indicating that the single-use token is invalid for age verification and to prompt a sales associate to scan a machine-detectable representation of an identification card as an alternative way to perform age verification. If the sales associate decides to proceed, the validation checker 722 may be activated by the sales associate to instruct the scan/image capture device 706 at line 724 to scan the machine-detectable representation from the identification card and sends the scanned machine-detectable representation at line 726 to the data router 710. For example, In turn, the data router 710 sends the scanned machine-detectable representation to a third-party age verification platform 713 at line 728 for determining based on the data encoded in the scanned machine-detectable representation whether the user 114 meets a legal age threshold for the transaction.

Responsive to a message at line 730 from the third-party age verification platform 713 that the user 114 does not meet the legal age threshold, which is routed by the data router 710 to the validation checker 722 at line 732, the validation checker 722 stops the age verification process and instructs the display device 740 to display a message indicating an unsuccessful age verification at line 736. The validation checker 722 may send the unsuccessful age verification message at line 738 to the display device 740.

Responsive to a notification from the third-party age verification platform 713 at line 730 that the user 114 does meet the legal age threshold, which is routed by the data router 710 to the validation checker 722 at line 732, the validation checker 722 instructs the I/O device 714 to send the machine-detectable representation to the token authority application 124 at line 734. In turn, the token authority application 124 may generate a pseudonymous persona code based on the scanned machine-detectable code, and then generate a single-use token for proof of legal age from the pseudonymous persona code.

Example Process of an Age Verification Server

FIG. 8 is a flow diagram of an example process 800 for creating and verifying users using an age verification server 120 in the age verification system 100, such as that shown in FIG. 1. At block 802, a tokenization authority application 124 at the age verification server 120 receives a machine-detectable representation of an identification card (not shown) from a mobile device 112 or from a POS controller 105 of a business 102. The machine-detectable representation may be accompanied by a request to generate a pseudonymous persona code based on the machine-detectable representation. At block 804, the tokenization authority application 124 generates a pseudonymous persona code based on the received machine-detectable representation. In various embodiments, the pseudonymous persona code by applying a hash algorithm to data contained in the machine-detectable representation. For example, the hash algorithm may be an HMAC algorithm, a SHA256 algorithm, an RSASSA-PSS algorithm, or some other hash algorithm.

At decision block 806, the tokenization authority application 124 determines whether the generated pseudonymous persona code is verified. For example, the token authority application 124 may generate a verified pseudonymous persona code when a machine-detectable representation is received from the POS controller 105. However, the token authority application 124 may generate an unverified pseudonymous persona code that is to be subsequently verified when a machine-detectable representation is received from a mobile device 112. At block 808, responsive to determining at decision block 806 that the generated pseudonymous persona code has been verified, the tokenization authority application 124 stores the generated pseudonymous persona code as verified. Subsequently, the tokenization authority application 124 issues a single-use token and associates the single-use token with the corresponding pseudonymous persona code. The single-use token is sent to the requesting entity that originally sent the machine-detectable representation, such as the mobile device 112 or the POS controller 105. The single-use token may be used for age verification for an age-restricted product in a transaction by a mobile device that is associated with the corresponding pseudonymous persona code. The single-use token may be a token that can be used for age verification use for a single transaction. Each of the single-use tokens includes a globally unique code that contains a string of numerals and/or characters that uniquely identify the token. In some instances, after use with a transaction, the single-use token is invalidated by the tokenization authority application 124. Subsequently, the tokenization authority application 124 issues a new single-use token to the mobile device associated with the corresponding pseudonymous persona code for use as age verification. The currently valid tokens, the information regarding the associations between the currently valid tokens and corresponding pseudonymous persona codes may be stored by the tokenization authority application 124 in a token database of the age verification server 120. Additionally, the pseudonymous persona code of each user may be used by the POS controller 105, or some other transaction information management function, such as a third-party function, to track the transaction details of the transaction related to the use of each single-use token by the user. For example, the details may include the time and date of the transaction, the identification information of the one or more age-restricted products included in the transaction, the identification information of the associated single-use token, and/or so forth. In other instances, each of the single-use tokens may have a predetermined valid time period (e.g., one day, two days, etc.). Such transaction details tracked using corresponding pseudonymous persona codes may be stored by the tokenization authority application 124 in a transaction detail database of the age verification server 120. Once the valid time period of a single-use token elapses, the tokenization authority application 124 may invalidate the single-use token regardless of whether the token was used in a transaction for age verification. At block 810, responsive to determining that the generated pseudonymous persona code is not verified at decision block 806, the tokenization authority application 124 stores the received pseudonymous persona code as unverified.

At block 812, the tokenization authority application 124 receives an additional machine-detectable representation from a POS controller of a business. For example, the user of the mobile device 112 may be trying to purchase or acquire one or more age-restricted products in a transaction. Accordingly, the user may be asked by a sales associate at the business to show a government-issued identification card that has the machine-detectable representation. In various embodiments, the additional machine-readable representation may be sent by the POS controller following the sales associate visually or using facial recognition technology to verify that a facial appearance of a user who presented a government-issued identification card that includes the machine-detectable code matches the picture on the government-issued identification card. At block 814, the tokenization authority application 124 may generate an additional pseudonymous persona code from the additional machine-detectable representation. At decision block 816, the tokenization authority application 124 determines whether the additional pseudonymous persona code matches the unverified pseudonymous persona code. At block 818, responsive to determining that the additional pseudonymous persona code does not match the unverified pseudonymous persona code, the tokenization authority application 124 continues to store the unverified pseudonymous persona code without changing its verification status. At block 820, responsive to determining that the additional pseudonymous persona code matches the unverified pseudonymous persona code, the tokenization authority application 124 changes the verification status of the unverified pseudonymous persona code to verified. At block 822, the tokenization authority application 124 issues a single-use token and associates the single-use token with the now verified pseudonymous persona code. The single-use token is sent by the tokenization authority application 124 to the POS controller 105 that originally sent the additional machine-detectable representation. The single-use token may be used for age verification for the one or more age-restricted products in a transaction that is associated with the pseudonymous persona code.

Components of an Age Verification Server

Figure 9:
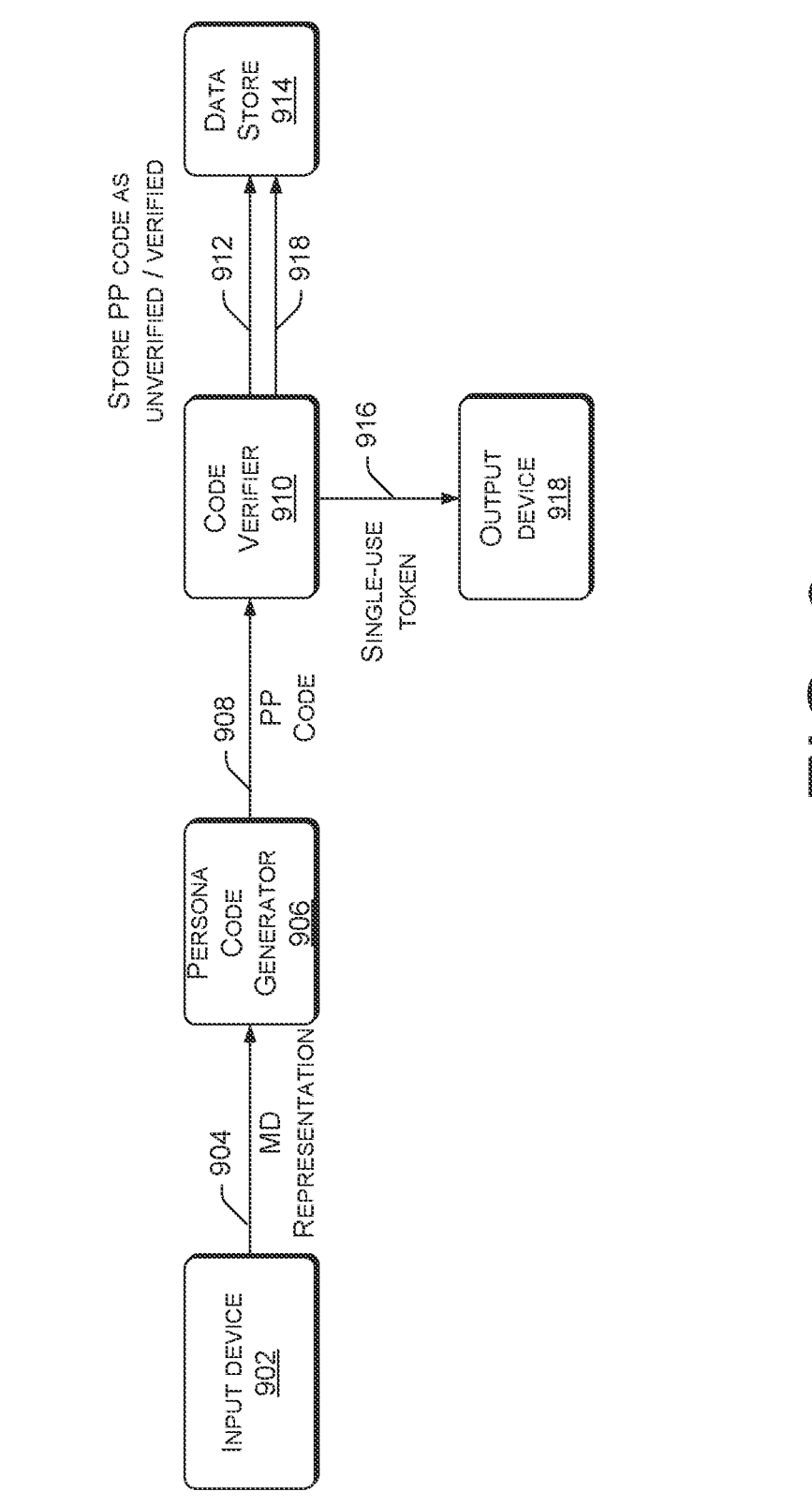
FIG. 9 is a block diagram showing various components of an age verification server that implements creating and verifying users in the age verification system, such as that shown in FIG. 1, in accordance with various embodiments.

FIG. 9 is a block diagram showing various components of an age verification server 120 that implements creating and verifying users in the age verification system 100, such as that shown in FIG. 1. A tokenization authority application 124 at the age verification server 120 receives at an input device 902 a machine-detectable representation of an identification card (not shown) from a mobile device or from a business. The input device 902 sends at step 904 the received machine-detectable representation to a persona code generator 906 that generates a pseudonymous persona code. The generated pseudonymous persona code may be a verified code if the machine-detectable representation is received from a POS controller of a business, and an unverified code if the machine-detectable representation is received from a mobile device. The persona code generator 906 sends at step 908 the generated pseudonymous persona code to a code verifier 910 that determines whether the pseudonymous persona code is verified. Responsive to determining that the pseudonymous persona code is verified, the code verifier 910 sends the verified pseudonymous persona code to a data store 914 for storage at step 912, and further issues and sends at step 916 a single-use token to an output device 918 that sends the single-use token to a mobile device associated with the pseudonymous persona code for an age-restricted product in a transaction. Responsive to determining that the pseudonymous persona code is not verified, the code verifier 910 sends the pseudonymous persona code to the data store 914 that stores the pseudonymous persona code as unverified at step 912.

It should be noted that FIGS. 4, 6, and 8 present illustrative processes for creating and verifying users using the mobile device 112, the POS controller 105, and the age verification server 120 in an age verification system 100. Each of the processes is illustrated as a collection of blocks in a logical flow chart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform particular functions or implement particular abstract data types. The order in which the operations are described is not intended to be construed as a limitation, and any number of the described blocks can be combined in any order and/or in parallel to implement the process.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. One or more computer-readable media storing computer-executable instructions that upon execution cause one or more processors to perform acts comprising:

receiving, from a mobile device, a first machine-detectable representation scanned from a government-issued identification card of a user, the first machine-detectable representation encoding information that includes a date of birth of the user, converting the information encoded in the first machine-detectable representation into a first pseudonymous persona code that uniquely identifies the user;

storing the first pseudonymous persona code in a data store as an unverified pseudonymous persona code;

receiving, from a point-of-sale (POS) device, a second machine-detectable representation scanned from the mobile device;

converting information encoded in the second machine-detectable representation into a second pseudonymous persona code;

comparing the second pseudonymous persona code to the unverified pseudonymous persona code;

determining, based on the comparison, whether the second pseudonymous persona code matches the unverified pseudonymous persona code;

responsive to determining that the second pseudonymous persona code matches the unverified pseudonymous persona code, designating, in the data store, the unverified pseudonymous persona code as a verified pseudonymous persona code;

generating, based on the verified pseudonymous persona code, a single-use token that stands as proof of legal age that the user meets an age requirement for purchasing an age-restricted product;

associating the single-use token in the data store with the verified pseudonymous persona code; and issuing the single-use token; and responsive to determining that the second pseudonymous persona code does not match the unverified pseudonymous persona code, continuing to store the unverified pseudonymous persona code in the data store as unverified.

2. The one or more computer-readable media of claim 1, wherein the single-use token is issued to the mobile device; and wherein the single-use token is encoded by the mobile device as machine-detectable code.

3. The one or more computer-readable media of claim 2, wherein the machine-detectable code is displayable by the mobile device with a self-portrait image of the user on a screen of the mobile device.

4. The one or more computer-readable media of claim 2, wherein the machine-detectable representation is a PDF417 barcode and the machine-detectable code is a quick response (QR) code.

5. The one or more computer-readable media of claim 1, wherein the second machine-detectable representation is received from the POS device following a verification that a facial appearance of the user matches a photograph of the user on the government-issued identification card.

6. The one or more computer-readable media of claim 1, wherein the acts further comprise tracking transaction details of the transaction related to the single-use token via the verified pseudonymous persona code.

7. The one or more computer-readable media of claim 1, wherein the acts further comprise:

receiving, from a third-party age verification platform, verification that the information encoded in the first machine-detectable representation indicates that the user meets the predetermined age threshold for purchasing the age-restricted product.

8. The one or more computer-readable media of claim 1, wherein the acts further comprise sending the single-use token as issued to the POS device.

9. The one or more computer-readable media of claim 7, further comprising:

receiving, from the third-party age verification platform, verification that the information encoded in the first machine-detectable representation indicates that the government-issued identification card is authentic.

10. A computer-implemented method, comprising:

receiving, from a mobile device at a tokenization authority application on a server, a first machine-detectable representation scanned from a government-issued identification card of a user, the first machine-detectable representation encoding information that includes a date of birth of the user;

converting, via the tokenization authority application, the information encoded in the first machine-detectable representation into a first pseudonymous persona code that uniquely identifies the user;

storing, via the tokenization authority application, the first pseudonymous persona code in a data store as an unverified pseudonymous persona code;

receiving, from a point-of-sale (POS) device, a second machine-detectable representation scanned from the mobile device;

converting information encoded in the second machine-detectable representation into a second pseudonymous persona code;

comparing the second pseudonymous persona code to the unverified pseudonymous persona code;

determining, based on the comparison, whether the second pseudonymous persona code matches the unverified pseudonymous persona code;

responsive to determining that the second pseudonymous persona code matches the unverified pseudonymous persona code, designating, in the data store via the token authority application, the unverified pseudonymous persona code as a verified pseudonymous persona code;

generating, based on the verified pseudonymous persona code, a single-use token that stands as proof of legal age that the user meets an age requirement for purchasing an age-restricted product;

associating the single-use token in the data store with the verified pseudonymous persona code; and issuing the single-use token; and responsive to determining that the second pseudonymous persona code does not match the unverified pseudonymous persona code, continuing to store the unverified pseudonymous persona code in the data store as unverified.

11. The computer-implemented method of claim 10, wherein the single-use token is issued to the mobile device; and wherein the single-use token is encoded by the mobile device as machine-detectable code.

12. The computer-implemented method of claim 10, wherein the machine-detectable code is displayable by the mobile device with a self-portrait image of the user on a screen of the mobile device.

13. The computer-implemented method of claim 10, wherein the acts further comprise:

receiving, from a third-arty age verification platform, verification that the information encoded in the first machine-detectable representation indicates that the user meets the predetermined age threshold for purchasing the age-restricted product.

14. The computer-implemented method of claim 10, wherein the second machine-detectable representation is received from the POS device following a verification that a facial appearance of the user matches a photograph of the user on the government-issued identification card.

* * * * *